US010246068B2

(12) United States Patent
Lauhoff

(10) Patent No.: US 10,246,068 B2
(45) Date of Patent: *Apr. 2, 2019

(54) PRESSURE MODULATOR FOR AN ABS SYSTEM

(71) Applicant: BRAKE FORCE ONE GMBH, Tuebingen (DE)

(72) Inventor: Jakob Lauhoff, Tuebingen (DE)

(73) Assignee: BRAKE FORCE ONE GMBH, Tuebingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/643,570

(22) Filed: Jul. 7, 2017

(65) Prior Publication Data

US 2018/0009424 A1 Jan. 11, 2018

(30) Foreign Application Priority Data

Jul. 7, 2016 (DE) .................. 10 2016 112 487

(51) Int. Cl.
*B60T 8/42* (2006.01)

(52) U.S. Cl.
CPC .............. *B60T 8/4266* (2013.01); *B60T 8/42* (2013.01); *B60T 8/4208* (2013.01)

(58) Field of Classification Search
CPC ........ B60T 8/42; B60T 8/4208; B60T 8/4266; B60T 8/1812; B60T 8/3675; B60T 8/368
USPC ........................................... 303/115.1, 115.2
See application file for complete search history.

(56) References Cited

U.S. PATENT DOCUMENTS

| 4,275,934 | A | | 6/1981 | MacDonald | |
|---|---|---|---|---|---|
| 4,435,021 | A | | 3/1984 | Hoenick | |
| 4,714,300 | A | * | 12/1987 | Heess | B60T 8/268 |
| | | | | | 303/113.2 |
| 4,900,104 | A | * | 2/1990 | Clifford | B60T 8/4266 |
| | | | | | 251/129.15 |
| 4,957,331 | A | * | 9/1990 | Burton | B60T 8/4266 |
| | | | | | 303/115.2 |
| 5,332,304 | A | * | 7/1994 | Maas | B60T 8/367 |
| | | | | | 137/627.5 |
| 5,443,306 | A | | 8/1995 | Broome | |
| 5,590,936 | A | | 1/1997 | Reuter | |
| 5,941,611 | A | * | 8/1999 | Trzmiel | B60T 7/042 |
| | | | | | 188/358 |

(Continued)

FOREIGN PATENT DOCUMENTS

| DE | 28 54 574 | 6/1979 |
|---|---|---|
| DE | 69309173 T2 | 7/1997 |

(Continued)

OTHER PUBLICATIONS

Japanese Office action dated Jun. 19, 2018 (with English translation)
Japanese Office Action issued on Jun. 21, 2018 (with English translation).

*Primary Examiner* — Nicholas J Lane
(74) *Attorney, Agent, or Firm* — Collard & Roe, P.C.

(57) ABSTRACT

A pressure modulator for an ABS system includes a housing that which has a hydraulic inlet and a hydraulic outlet that are interconnected via a hydraulic line; a volume accumulator that increases a volume of the hydraulic line during an activated anti-lock function, a linear drive for opening the volume accumulator and an electronic circuit that controls the linear drive and is disposed in the housing.

14 Claims, 3 Drawing Sheets

(56) References Cited

U.S. PATENT DOCUMENTS

| | | | |
|---|---|---|---|
| 6,206,485 B1 | 3/2001 | Feigel et al. | |
| 2003/0111898 A1* | 6/2003 | Reuter | B60T 8/368 303/122.09 |
| 2004/0207256 A1* | 10/2004 | Volz | B60T 8/368 303/119.3 |
| 2014/0285987 A1* | 9/2014 | Nagashima | H05K 7/12 361/759 |
| 2017/0333963 A1 | 11/2017 | Cho | |
| 2018/0009424 A1* | 1/2018 | Lauhoff | B60T 8/4266 |

FOREIGN PATENT DOCUMENTS

| | | |
|---|---|---|
| DE | 197 20 636 | 11/1998 |
| DE | 10 2008 019 469 | 10/2009 |
| DE | 10 2014 007 717 | 9/2015 |
| EP | 0 580 382 | 1/1994 |
| GB | 1 413 969 | 11/1975 |
| JE | 35 26 189 A1 | 2/1987 |
| JP | 61-181751 | 8/1986 |
| JP | S61181751 A | 8/1986 |
| JP | S6317154 A | 1/1988 |
| JP | H06156237 A | 6/1994 |
| JP | 2015-74345 | 4/2015 |
| KR | 20110124602 A | 11/2011 |
| WO | WO 81/00697 | 3/1981 |
| WO | WO 97/29934 | 8/1997 |

\* cited by examiner

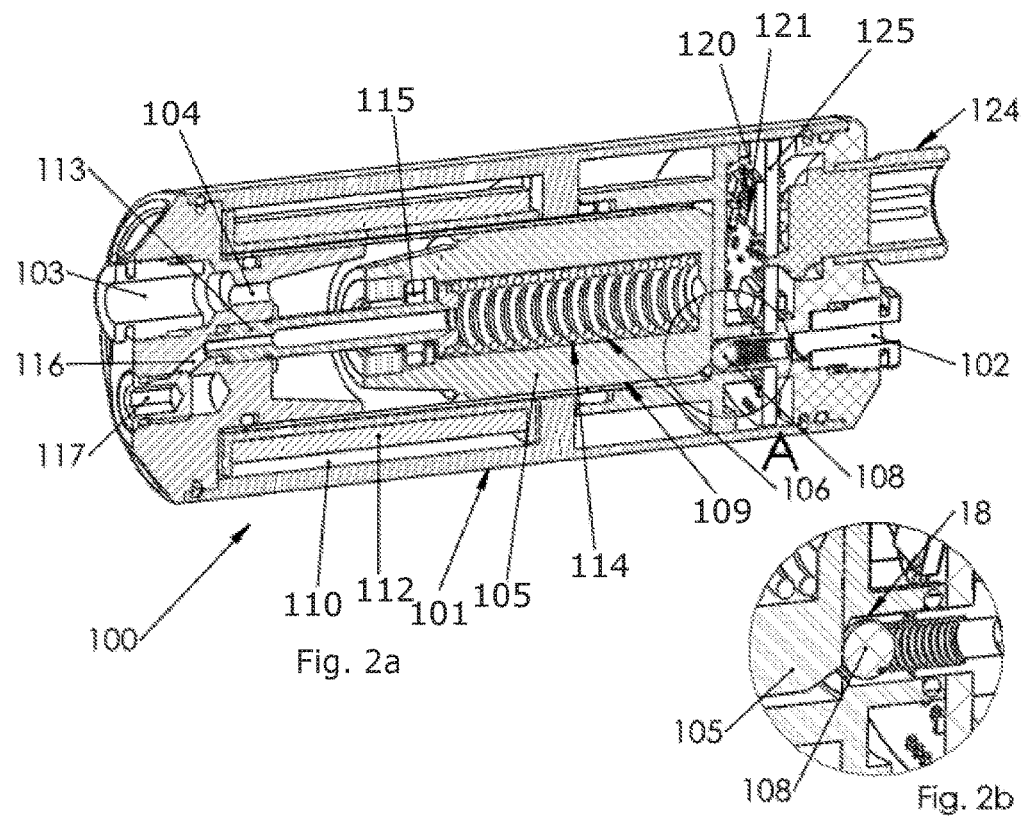
Fig. 2a
Fig. 2b
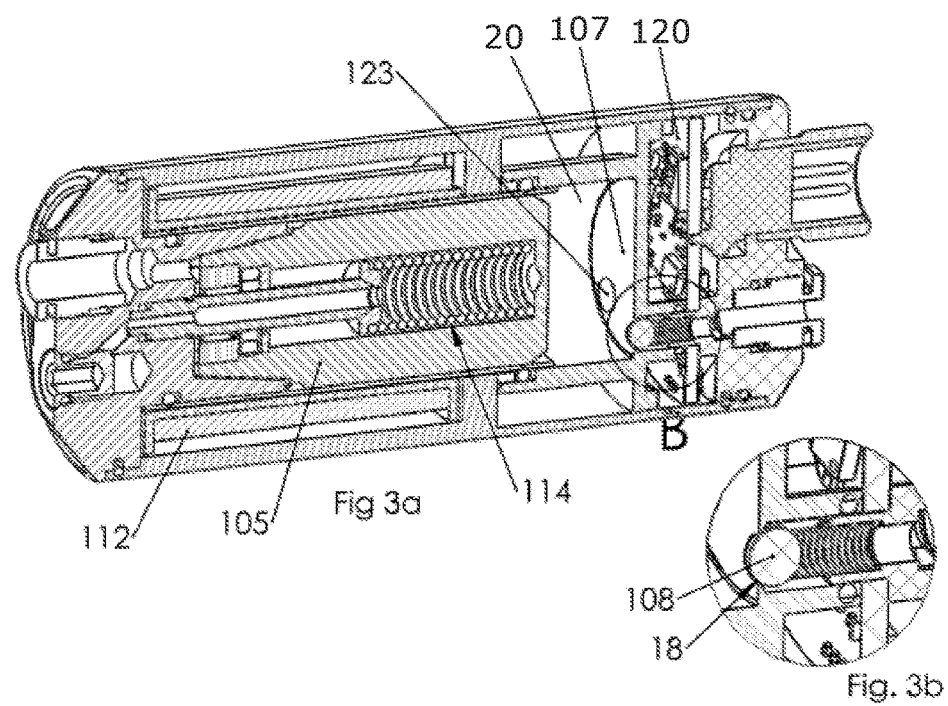
Fig 3a
Fig. 3b

PRESSURE MODULATOR FOR AN ABS SYSTEM

CROSS-REFERENCE TO A RELATED APPLICATION

The invention described and claimed hereinbelow is also described in German Patent Application DE 10 2016 112 487.7, filed on Jul. 7, 2016. The German Patent Application, the subject matter of which is incorporated herein by reference, provides the basis for a claim of priority of invention under 35 U.S.C. 119(a)-(d).

BACKGROUND OF THE INVENTION

The present invention relates to a pressure modulator for an ABS system that comprises a housing with a hydraulic inlet and a hydraulic outlet that are interconnected thereto via a hydraulic line, a volume accumulator that increases the volume of the hydraulic line during an activated anti-lock function and a linear drive provided for opening the volume accumulator.

Conventional pressure modulators are known. For example, a pressure modulator is described in DE 10 2014 007 717 B4. Such a pressure modulator arrangement according to the prior art, however, does not define where the control device described therein is disposed. In a case of an external arrangement, it must be ensured that appropriately secure lines are provided for safety-critical signals.

SUMMARY OF THE INVENTION

The present invention overcomes the shortcomings of known arts, such as those mentioned above.

The invention provides a pressure modulator for an antilock braking system (ABS) comprising a housing with a hydraulic inlet and a hydraulic outlet that are interconnected via a hydraulic line, a volume accumulator that increases the volume of the hydraulic line during an activated anti-lock function, a linear drive for opening the volume accumulator and an electronic circuit that controls the linear drive and is disposed in the housing. A control device designed as an electronic circuit is disposed in the housing of the pressure modulator. The inventive pressure modulator results in a particularly space-saving design. Preferably, the electronic circuit is disposed in the housing of the pressure modulator in a well-protected and low-cost manner. In addition, fewer safety-critical and time-critical signal connections are necessary as a result of the inventive pressure modulator design.

The hydraulic inlet and the hydraulic outlet can be implemented by plug-in connectors to enable a simple and tool-free assembly/disassembly, when service is performed.

Further advantages result when a pressure sensor, which detects the pressure in the volume accumulator and is disposed in the housing, is provided. The pressure in the volume accumulator is detected by the pressure sensor and, proceeding therefrom, the pressure modulator and, a brake system, can be controlled.

The electronic circuit preferably comprises an acceleration sensor, a microprocessor and/or a power output stage. Therefore, all the components that are necessary for the determination of time-critical signals are disposed in the pressure modulator. Time-critical signals are thereby generated in the pressure modulator.

The pressure sensor is preferably disposed on a printed circuit board comprising the electronic circuit. In this case, the pressure sensor is connected to the volume accumulator via a direct hydraulic connection. The result is a low-cost, lightweight, and space-saving arrangement of the pressure sensor. The pressure sensor can be directly integrated on the printed circuit board in a particularly low-cost way using SMD technology.

The electronic circuit can be disposed axially next to the volume accumulator in a (separate) chamber of the housing. The electronic circuit is therefore disposed in a particularly well-protected and low-cost manner. There is no need to provide a separate housing for the electronic circuit or for the control device.

Due to the integration of the printed circuit board into the robust metallic housing of the pressure modulator, the printed circuit board is protected against environmental influences such as dirt, water and dust, and against EMC interferences such as radiation from other control devices, motors, or the like. The integration of the pressure sensor, the acceleration sensor and the microcontroller also prevents an interference of the signals by magnetic fields, since signal paths between the sensor and the controller are quasi no longer present.

The surroundings of the pressure modulator also are protected against radiation from the pressure modulator and its electronics due to the integration into the metallic housing. In this way, requirements on electromagnetic compatibility can be more easily implemented. Possible positions are, on the one hand, an arrangement between the hydraulic inlet and the volume accumulator, and on the other hand, an arrangement between the volume accumulator and the hydraulic outlet.

The hydraulic line can be routed through the electronic circuit. For that matter, the hydraulic inlet, the hydraulic output, and the electronic circuit also can be installed on one side. This can be advantageous when all lines on the bicycle are routed to the actuator from the same direction. This is the case, for example, when the actuator is to be "hidden" in the interior of the body. In this case, however, two hydraulic passages through the electronic circuit are required.

The linear drive can comprise a rotor bar, where a displacement movement of the rotor bar effectuates the opening of the volume accumulator against the spring force of a spring element.

According to a refinement, the spring element is supported, at least indirectly, on the housing and the rotor bar, wherein the spring element is disposed in the rotor bar. A particularly compact design of the pressure modulator is realized because of this arrangement.

In addition, the invention so defined makes it possible to eliminate the need to move one part of the hydraulic line relative to the housing of the pressure modulator. The functional reliability of the pressure modulator is increased as a result. In addition, the number of dynamic seals required is reduced.

The compact design of the pressure modulator also is supported when a control piston is provided that extends into the rotor bar, is fixedly connected to the housing and on which the spring element is supported. The control piston, the spring element, and the rotor bar are preferably coaxially disposed. The length of the control piston and the compressed spring element can substantially correspond to the length of the rotor bar.

Further advantages result when the pressure modulator comprises precisely one dynamic seal which acts between the rotor bar and the control piston. The functional reliability can be increased when few dynamic seals are provided.

The control piston is designed as a hollow body. It is thereby possible to remove hydraulic fluid that gets into the interior of the rotor bar, for example, due to slip leakage in an area of the dynamic seal. In this context, it is advantageous when the control piston is connected to a closeable liquid outlet. The liquid outlet can be provided, for example, in an end face of the housing.

Advantages result when the rotor bar is disposed in the hydraulic line in such a way that hydraulic medium can flow around the rotor bar. The rotor bar can be guided in the housing and the hydraulic fluid can effectuate a lubrication of the rotor bar, and so the rotor bar is movable in the housing in a low-wear and low-friction manner. The hydraulic medium can be conducted through via the guidance play between the rotor bar and a guide bushing.

The rotor bar also may be arranged to comprise at least one hydraulic fluid recess. For example, the rotor bar may have on its lateral face at least one groove extending helically or in the longitudinal direction of the rotor bar. Hydraulic fluid can therefore flow along the rotor bar by the groove. Alternatively, or additionally, the rotor bar can have passage openings oriented in the longitudinal direction of the rotor bar, through which hydraulic fluid can flow from the hydraulic inlet to the hydraulic outlet of the pressure modulator.

According to an embodiment, a valve arrangement, which is actuated by the rotor bar, is provided in the hydraulic line. The valve can be opened by the rotor bar when the rotor bar is in a home position, i.e., is pressed into a predefined position by the spring element up to a defined maximum pressure. As a result, the rotor bar can press, for example, against a ball of a non-return valve, which is spring-loaded, thereby opening the valve. However, if the anti-lock function is activated and the rotor bar is moved against the spring force of the spring element, the contact between the rotor bar and the ball of the valve is released, and so the ball closes the valve and a further supply of hydraulic fluid through a master cylinder is blocked. Due to a valve arrangement designed in this way, only one single valve in the pressure modulator is necessary. As an alternative to the ball, a component having a seal applied thereon would also operate according to the inventive principles, the component closing a bore hole between the hydraulic inlet and the rotor bar.

The housing of the pressure modulator can have a cylindrical outer shape, and so a simple installation on a vehicle can take place, for example, via clamps or via insertion in tubes. Such cylindrical out shape also makes it easier to seal the housing with respect to external influences in a low-cost way, using O-rings.

BRIEF DESCRIPTION OF THE DRAWINGS

Further features and advantages of the invention will become apparent from the description of embodiments that follows, with reference to the attached figures, wherein:

FIG. 2a presents a perspective sectional view of a pressure modulator, in which the parts necessary for the anti-lock function are integrated, in the case of a non-activated antilock braking system (ABS) function;

FIG. 2b depicts a detail A from FIG. 2a;

FIG. 3a is a representation corresponding to FIG. 2a, in the case of an activated antilock braking system (ABS) function;

FIG. 3b depicts a detail B from FIG. 3a;

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
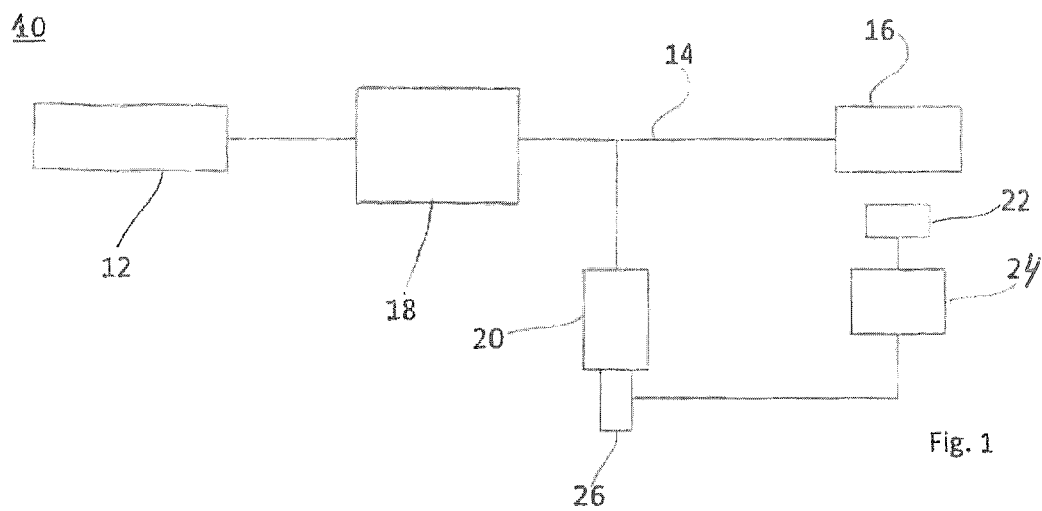
FIG. 1 is a schematic representation of a hydraulic brake system having an anti-lock function for a bicycle.

FIG. 1 shows a brake system having an anti-lock function for an electric bicycle, labeled overall with the reference number 10.

The hydraulic brake system 10 comprises a master cylinder 12 that can be actuated, e.g., via a brake lever, and which is connected to a wheel brake 16 in a hydraulically communicating way via a hydraulic line 14. Hydraulic pressure necessary for the response of the wheel brake 16 is generated via the master cylinder 12 in a known way.

FIG. 1 further shows a valve arrangement 18 is disposed downstream from the master cylinder 12. The hydraulic brake system also comprises a volume accumulator 20, which is to be opened against a spring force of a spring element, a speed sensor 22, and a control device 24.

A representation of the spring element of the volume accumulator 20 was dispensed with in the schematic representation according to FIG. 1. The spring element, however, is dimensioned in such a way in this case that the resultant spring force is greater than a hydraulic force that can be generated by the master cylinder 12.

As is further shown in FIG. 1, the hydraulic brake system 10 also comprises an electric drive 26 that is controlled via the control device 24 and which, in turn, is operatively connected to the spring element of the volume accumulator 20. The electric drive 26, the control device 24 and the speed sensor 22 are connected to each other via appropriate communication lines. The electric drive 26 is operatively connected to the spring element of the volume accumulator 20 in such a way, in this case, that an active return movement of the spring element and, therefore, the opening of the volume accumulator, is effectuated.

The following describes operation of the hydraulic brake system 10:

As soon as the control device 24 detects the blocking of the wheels by the speed sensor 22, the electric drive 26 is activated to open the volume accumulator 20 against the spring force of the spring element; at the same time, the valve arrangement 18 is mechanically or electrically closed.

The master cylinder 12 is therefore hydraulically separated from the wheel brake 16, i.e., a rider cannot further increase the pressure in the brake caliper, since the handle is quasi clamped.

The volume accumulator 20 is opened and the volume in the hydraulic line 14 therefore increases, and so the hydraulic pressure in the brake system 10 drops.

By use of the electric drive 26, the pressure is therefore regulated for as long as necessary until the riding stability is ensured even without the anti-lock function. The volume accumulator 20 is subsequently closed and the valve arrangement 18 is opened again. Consequently, the brake system 10 functions entirely normally again.

FIG. 2a shows a pressure modulator 100 according to the invention. The pressure modulator 100 comprises a housing 101 which has a hydraulic inlet 102 and a hydraulic outlet 103. The hydraulic inlet 102 and the hydraulic outlet 103 are connected to each other by a hydraulic line 104, which is a component of the hydraulic line 14.

The hydraulic inlet 102 and the hydraulic outlet 103 can be implemented by plug-in connectors, to enable a simple and tool-free assembly/disassembly when service is performed.

If the ABS function is not activated, a rotor bar 105 is located in a home position, as shown in FIG. 2a. The rotor bar 105 is moved to the right due to the spring force of the spring element 106, and so the rotor bar rests against a housing wall 107 (see FIG. 3a which shows the situation during an activated ABS function). In this position (see enlarged representation according to FIG. 2b), the rotor bar 105 presses against a valve element 108, which is designed as a ball, of the valve arrangement 18, and so the valve arrangement 18 is opened and the hydraulic fluid can flow through the valve arrangement 18. The hydraulic fluid can then continue to flow along a gap between the lateral face of the rotor bar 105 and the housing wall 109 to the hydraulic outlet 103.

When the anti-lock function is activated, the electric drive 26 designed as a linear drive 110 is activated and moves the rotor bar 105 into the position shown in FIG. 3a, against the spring force of the spring element 106. As a result, the volume accumulator 20 is opened. The volume of the hydraulic line 104 is therefore increased, and so the pressure applied by the hydraulic fluid onto a wheel brake is reduced and the wheel brake is opened. The displacement of the rotor bar 105 into the position shown in FIG. 3a also has the effect that the valve element 108 is moved to the left and, therefore, the valve arrangement 18 closes (see the representation in FIG. 3b). A master cylinder is therefore decoupled from the wheel brake.

The linear drive 110 comprises a cylindrical coil arrangement 112, by which the rotor bar 105 can be pulled in.

The spring element 106 is supported, at one end, on the rotor bar 105 and, at the other end, on a control piston, 113 which is fixedly connected to the housing 101. The spring element is therefore supported on the housing 101 indirectly via the control piston 113. When the rotor bar 105 is displaced to the left, according to FIG. 3a, the volume 114 in an area of the spring element 106 in the rotor bar 105 is therefore reduced, and the air located therein is compressed.

The rotor bar 105 is sealed with respect to the control piston 113 via a dynamic seal 115. If hydraulic fluid nevertheless gets into the interior of the rotor bar 105 due to a slip leakage, this can result in a failure of the system. To enable fluid removal, the control piston 113 is designed to be hollow and is connected to a closeable fluid outlet 116. The fluid outlet 116 can be closed by use of a screw 117.

Figure 4:
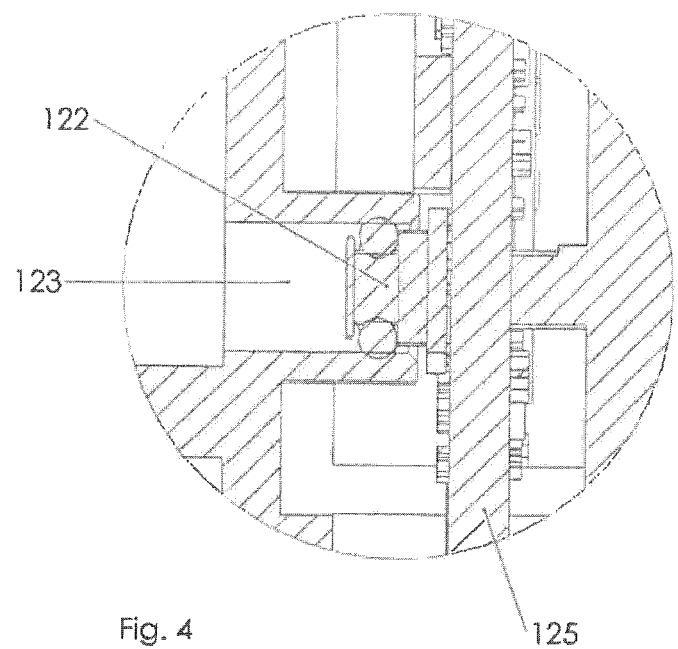
FIG. 4 presents a sectional representation of an enlarged section of the inventive pressure modulator.

A housing chamber 120 is provided in the housing 101 and directly adjoins the volume accumulator 20 in the axial direction. An electronic circuit 121, which represents the control device 24, is provided in the housing chamber 120. This electronic circuit 121 is therefore completely integrated into the pressure modulator 100. In one form, the electronic circuit 121 comprises an acceleration sensor, a microcontroller, and power output stages. The electronic circuit 121 also comprises a pressure sensor 122 (see FIG. 4), which is directly hydraulically connected to the volume accumulator 20. The housing wall 107 has a passage opening 123 for this purpose (see FIGS. 3a, 4).

An additional position detection of the rotor bar 105, e.g., by use of a Hall sensor, or a position detection of the rotor bar that is an alternative to the pressure sensor, may be included, according to the inventive principles.

In addition, an electric connection 124 is provided for transmitting control signals, for communicating with an external sensor system, for example, a speed sensor 22, and for power supply.

The hydraulic line 104 is routed through the electronic circuit 121 in an area of the valve arrangement 18. The electronic circuit 121 comprises a printed circuit board 125, on which the pressure sensor 122 also is disposed. Preferably, the electronic circuit 121 is disposed in the chamber 120 in a protected way. Accordingly, a separate housing need not to be provided.

Safety-critical and time-critical signals are therefore generated and are made available in the pressure modulator 100.

Figure 5:
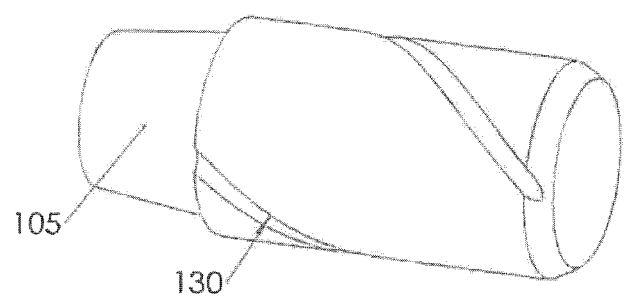
FIG. 5 depicts a rotor bar.

FIG. 5 shows a rotor bar 105 comprising helical grooves 130, which are formed on the lateral face of the rotor bar and allow hydraulic fluid to flow through. Alternatively, the grooves 130 also can extend in parallel to a longitudinal axis of the rotor bar 105. For that matter, the grooves 130 can be provided in any number and shape, without deviating from the scope and spirit of the invention.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A pressure modulator for an antilock braking system (ABS), comprising:
    a housing having a hydraulic inlet and a hydraulic outlet that are interconnected via a hydraulic line;
    a volume accumulator for increasing a volume of the hydraulic line during an activated anti-lock function;
    a linear drive for opening the volume accumulator;
    an electronic circuit disposed in the housing for controlling the linear drive;
    a spring element, wherein the linear drive comprises a rotor bar and wherein a displacement movement of the rotor bar effectuates an opening of the volume accumulator against a spring force of the spring element; and
    a control piston that extends into the rotor bar, the control piston being fixedly connected to the housing and supporting the spring element.

2. The pressure modulator according to claim 1, further comprising a pressure sensor disposed in the housing for detecting a pressure in the volume accumulator.

3. The pressure modulator according to claim 1, wherein the electronic circuit comprises one or more of the following: an acceleration sensor, a microprocessor and a power output stage.

4. The pressure modulator according to claim 2, wherein the pressure sensor is disposed on a printed circuit board comprising the electronic circuit.

5. The pressure modulator according to claim 1, wherein the housing includes a chamber and wherein the electronic circuit is disposed axially next to the volume accumulator in the chamber of the housing.

6. The pressure modulator according to claim 1, wherein the hydraulic line is routed through the electronic circuit.

7. The pressure modulator according to claim 1, wherein the spring element is supported at least indirectly on the housing and the rotor bar, and wherein the spring element is disposed in the rotor bar.

8. The pressure modulator according to claim 1, further comprising precisely one dynamic seal that acts between the rotor bar and the control piston.

9. The pressure modulator according to claim 1, wherein the control piston is designed as a hollow body.

10. The pressure modulator according to claim 1, wherein the rotor bar is disposed in the hydraulic line in such a way that a hydraulic medium can flow around the rotor bar.

11. The pressure modulator according to claim 1, wherein the rotor bar comprises at least one hydraulic fluid recess.

12. The pressure modulator according to claim 11, wherein the at least one hydraulic fluid recess is arranged on a lateral face of the rotor bar and comprises at least one groove extending helically or in the longitudinal direction of the rotor bar.

13. The pressure modulator according to claim 1, further comprising a valve arrangement that is actuated by the rotor bar and provided in the hydraulic line.

14. A hydraulic brake system having an anti-lock function, comprising:
 a master cylinder that generates a hydraulic pressure and is connected to a wheel brake in a hydraulically communicating way via a hydraulic line; and
 a pressure modulator for an antilock braking system (ABS), wherein the pressure modulator comprises:
 a housing having a hydraulic inlet and a hydraulic outlet that are interconnected via the hydraulic line;
 a volume accumulator for increasing a volume of the hydraulic line during an activated anti-lock function;
 a linear drive for opening the volume accumulator;
 an electronic circuit disposed in the housing for controlling the linear drive;
 a spring element, wherein the linear drive comprises a rotor bar and wherein a displacement movement of the rotor bar effectuates an opening of the volume accumulator against a spring force of the spring element; and
 a control piston that extends into the rotor bar, the control piston being fixedly connected to the housing and supporting the spring element.

\* \* \* \* \*